Patented Jan. 24, 1928.

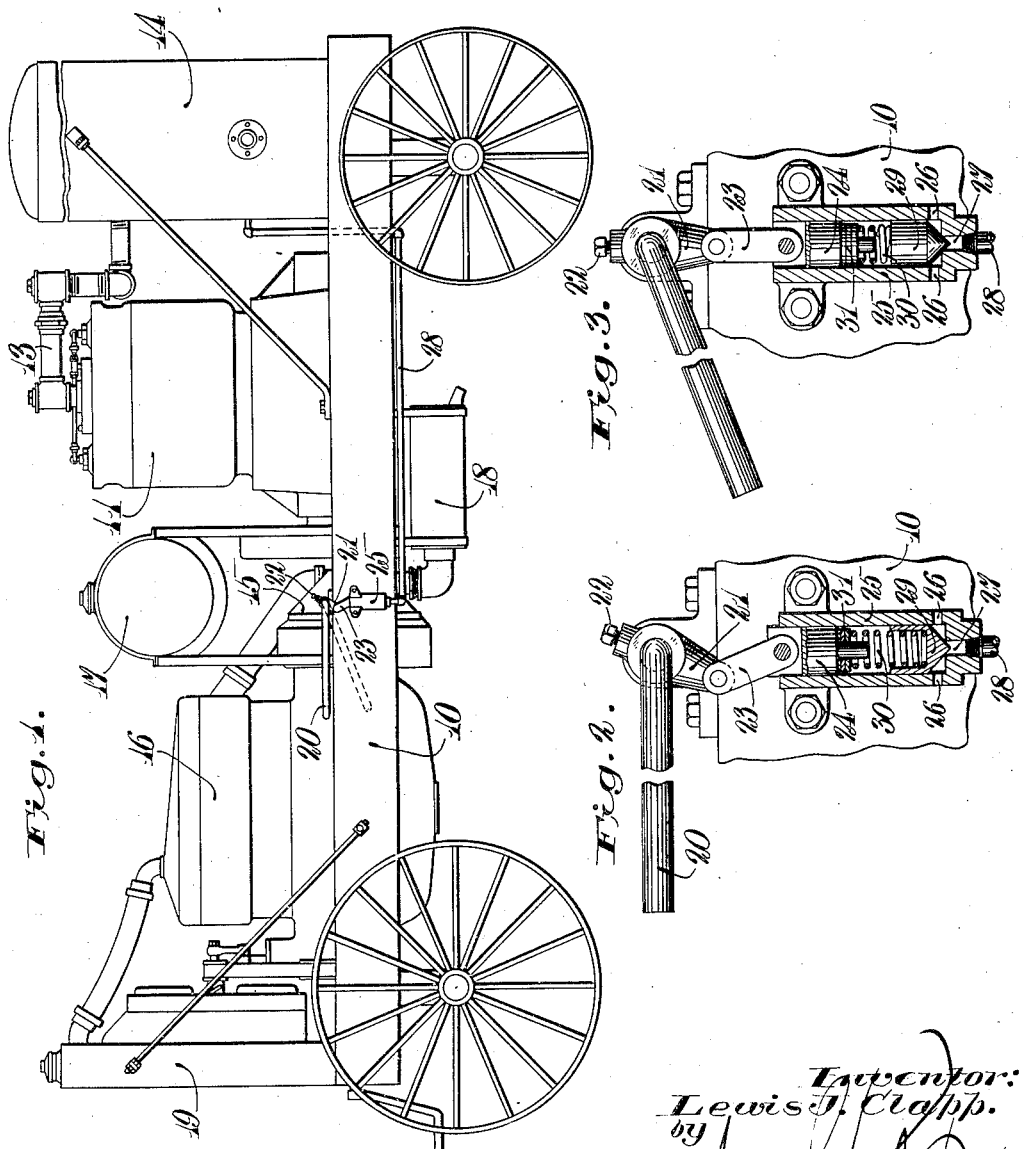

1,657,198

UNITED STATES PATENT OFFICE.

LEWIS J. CLAPP, OF CLAREMONT, NEW HAMPSHIRE, ASSIGNOR TO SULLIVAN MACHINERY COMPANY, A CORPORATION OF MASSACHUSETTS.

MOTOR-DRIVEN COMPRESSOR.

Application filed June 30, 1921. Serial No. 481,621.

This invention relates to motor driven compressors and especially, although not exclusively, to compressors driven by internal combustion engines and connected by clutch devices.

In the operation of such compressor plants it is necessary that the clutch be disconnected when the engine is started, and highly desirable that the compressor be unloaded when the clutch is thrown in, or when the compressor is otherwise started, in order to avoid stalling the motor and to permit the compressor to be brought up to its normal operating speed before being fully loaded.

The present invention has therefore for its object to provide simple and effective means whereby the controlling mechanism for the compressor actuating means, and particularly the controller or operating lever for the clutch connecting the motor and compressor, may be coordinated with means for controlling the load on the compressor in such a manner as to insure an unloaded condition of the compressor at the time of starting the same by throwing in the clutch or otherwise, at the same time insuring the loading of the compressor after its starting, and the subsequent unloading thereof when stopped, thereby leaving the same in an unloaded condition when again started.

The foregoing and other objects of invention, together with means whereby the same may be carried into effect, will best be understood from the following description of one form or embodiment thereof illustrated in the accompanying drawings, in which:—

Fig. 1 is a side elevation of a clutch controlled portable, internal combustion engine driven compressor having the invention applied thereto.

Fig. 2 is an enlarged detail view of the clutch controlling lever and unloading valve, showing the parts in the position occupied when the clutch is thrown out and the compressor unloaded.

Fig. 3 is a similar view showing the parts in the position to throw in the clutch and load the compressor.

The embodiment of the invention shown in Fig. 1 comprises a vehicle 10 of any suitable construction upon which is mounted a compressor 11 which may be of any well-known type, said compressor discharging, through suitable piping 13, into a receiver 14, and being driven, through suitable clutch mechanism 15, by an internal combustion engine 16, preferably of the motor vehicle type, supplied with fuel from the tank 17, and provided with the usual exhaust muffler 18 and cooling system including a radiator 19.

In accordance with the present invention, the clutch device 15 is operated or controlled by a hand lever 20 movable into the position shown in Fig. 2 and in full lines in Fig. 1 to throw out the clutch and disconnect the compressor and engine, or into the position shown in Fig. 3 and in dotted lines in Fig. 1 to throw in the clutch and operatively connect said compressor and engine. The shaft of the clutch controlling lever 20 carries an arm 21 secured thereto as by a set screw 22 and connected at its outer end by a link 23 with a slide or plunger 24 guided for rectilinear movement in a casing 25 carried by the frame of the vehicle 10. The arm 21 and link 23 constitute a form of toggle which, when the lever 20 is in the position shown in Fig. 3, is straightened to depress the slide or plunger 24, but which, when the lever 20 is in the position shown in Fig. 2, is broken to lift said slide. The casing 25 is provided with one or more ports 26 communicating with the atmosphere and with a port 27 connected by a pipe 28 with the receiver 14. The port 27 provides a seat for the conical end of a piston valve 29 guided in the casing 25 and between which and the slide or plunger 24 is interposed a spring 30.

When the clutch controlling lever 20 is moved into the position shown in Fig. 3 to throw in the clutch and start the compressor, the resulting depression of the slide or plunger 24 causes the spring 30 to be compressed, thereby loading the valve 29 and holding the same to its seat about the port 27 with a pressure which may be predetermined by interposing washers or followers 31 of a suitable number between said spring and plunger. The valve 29 therefore serves as a safety or relief valve for determining or limiting the maximum pressure which may be generated in the receiver 14 when the compressor is running. When the clutch controlling lever 20 is moved into the position shown in Fig. 2 to disconnect the clutch and stop the compressor, the plunger 24 is lifted, as above explained, thereby relieving the spring 30 of compression and permitting the pressure in the receiver 14 to unseat the valve 29 and escape through the ports 26, thus discharging the receiver. When therefore, the lever 20 is again operated to start the compressor, the receiver 14 will be substantially empty, thereby permitting the compressor to start in a substantially unloaded condition. Movement of the lever 20 to throw in the clutch, however, operates to straighten the toggle 21, 23, depress the plunger 24, and load the spring 30, thereby holding the valve 29 to its seat and permitting the pressure to be built up in the receiver 14 so as gradually to load the compressor.

From the foregoing it will be seen that the invention provides a combined receiver relief or safety valve and compressor unloading valve so coordinated with the controller for operatively connecting the compressor with its driving motor that, when the compressor is stopped, it will be automatically unloaded and the receiver emptied, so that, when said compressor is again started, it will be in unloaded condition, said parts however, being so constructed and arranged that when the compressor is started the valve referred to will be closed to permit the pressure to be gradually built up in the receiver and the compressor gradually loaded. In this manner all danger of attempting to start the compressor against receiver pressure, and consequent stalling of the motor, is effectually prevented.

While I have in this application shown and described in detail one embodiment which my invention may assume in practice, it is to be understood that this form has been chosen for illustrative purposes merely, and that the invention may be otherwise embodied and practiced without departing from its spirit or the scope of the claims hereunto appended.

What I claim as new and desire to secure by Letters Patent is:—

1. The combination with a compressor having means for controlling the fluid load thereon, a motor for driving the same, a clutch connecting said compressor and motor, and common means for controlling said fluid load controlling means and said clutch thereby to permit relative rotation between said motor and compressor.

2. The combination with a compressor, a motor for driving the same, and a clutch connecting said compressor and motor, of a lever for controlling said clutch, and an unloading valve operated by said lever.

3. The combination with a compressor, an internal combustion engine for driving the same, and a clutch connecting said engine and compressor, of a lever for controlling said clutch, a valve for unloading said compressor, a plunger, a spring interposed between said plunger and valve, and a toggle connecting said lever and plunger.

4. The combination with a compressor and actuating means therefor, of manually operated means for starting and stopping said compressor, and means mechanically controlled by said starting and stopping means for loading and unloading the compressor while the actuating means is adapted to be made operative.

5. The combination with a compressor, an internal combustion engine for driving the same, and a clutch for connecting said compressor and engine, of a manually operated lever for controlling said clutch, and a valve controlled by said lever for loading and unloading said compressor.

6. The combination with a compressor, a receiver therefor, and means for actuating said compressor, of manually operated, commonly controlled mechanical means for stopping said compressor and for discharging said receiver whereby said compressor is adapted to discharge into said receiver substantially unloaded upon being started.

7. The combination with a compressor, a receiver therefor, and means for actuating said compressor, of manually operated means for starting and stopping said compressor, and means mechanically controlled by said starting and stopping means for discharging said receiver.

8. The combination with a compressor, a receiver therefor, an internal combustion engine for driving said compressor, and a clutch connecting said engine and compressor, of a lever for controlling said clutch, and a valve controlled by said lever for discharging said receiver.

9. The combination with a compressor, a receiver therefor, and means for actuating said compressor, of means for starting and stopping said compressor, and means cooperating with said starting and stopping means for limiting the pressure in said receiver and for loading and unloading said compressor.

10. The combination with a compressor, a receiver therefor, and means for actuating said compressor, of a controller for starting and stopping said compressor, a spring pressed relief valve for said receiver, and means operated by said controller for loading and unloading said relief valve.

11. The combination with a compressor, a receiver therefor, an internal combustion engine for driving said compressor, and a clutch connecting said engine and compressor, of a lever for controlling said clutch, a spring pressed relief valve for said receiver, and means operated by said lever for compressing said spring for loading said relief valve.

12. The combination with a compressor, a receiver therefor, an internal combustion engine, and a clutch connecting said engine and compressor, of a lever for controlling said clutch, a spring pressed relief valve for said receiver, a plunger, a spring interposed between said plunger and valve, and a toggle connecting said lever and plunger.

13. The combination with a compressor and actuating means therefor, a clutch for connecting or disconnecting the same, a valve for loading and unloading said compressor, and a single means for controlling said clutch and valve.

14. The combination with a compressor, an internal combustion engine for driving the same, and means for connecting said compressor and engine, of control means therefor, and means operated by said control means for effecting unloading of said compressor without stopping the engine.

15. The combination with a compressor, an internal combustion engine for driving the same, a control member, and means controlled thereby for successively stopping and unloading said compressor without stopping the engine.

16. The combination with a compressor and actuating means therefor, of means for stopping and unloading said compressor without stopping said actuating means.

17. The combination with a compressor and actuating means therefor, of manually controlled means for starting and stopping said compressor, and means operative in different positions to load and unload the same, said means permitting the unloading of said compressor when it is stopped.

18. The combination with a compressor and actuating means therefor, of manually controlled means for starting and stopping said compressor, and means for loading and unloading the same, said manual means permitting the unloading of said compressor when it is stopped.

19. The combination with a compressor, a receiver therefor, an internal combustion engine for driving said compressor, and a clutch to connect said engine and said compressor, of a lever for controlling said clutch, a relief valve for said receiver, a plunger, and a spring interposed between said plunger and said valve for seating the same, said lever being operative to relieve the spring of compression to effect unloading of said compressor.

20. The combination with a compressor, a receiver therefor, an internal combustion engine for driving said compressor, and a clutch connecting said engine and compressor, of a lever for controlling said clutch, a relief valve for said receiver, a plunger, a spring interposed between said plunger and valve for seating the latter, and a toggle connecting said lever and plunger, movement of said lever to connect the engine and compressor applying pressure to said spring to seat said valve to effect loading of said compressor.

21. The combination with a compressor and actuating means therefor, of means for starting and stopping said compressor, means for loading and unloading the same while said actuating means is operative, and means for enabling automatic unloading of said compressor when it is stopped.

22. The combination with a compressor, a receiver therefor, and means for actuating said compressor, of manually operated, commonly controlled mechanical means for stopping said compressor and enabling automatic unloading of said receiver.

23. The combination with a compressor and actuating means therefor, of means for starting and stopping said compressor, means for loading and unloading the same, and mechanical connections between said starting and stopping means and said loading and unloading means whereby during operativeness of said actuating means, said compressor when stopped is adapted to be unloaded by said unloading means.

24. The combination with a compressor, an internal combustion engine for driving the same, and a clutch connecting said engine and compressor, of a lever for operating said clutch, a valve for loading and unloading said compressor, and mechanical connections between said lever and valve whereby operation of said valve to unload said compressor is permitted when said lever is operated to release said clutch.

25. The combination with a compressor, actuating means therefor and a tank to receive the discharge from the compressor, of a controller for starting and stopping said compressor, vent means for said tank adapted to be opened and closed, and closure means for said vent means mechanically connected to said controller whereby the opening and closing of said vent may be controlled.

26. The combination with a compressor, actuating means therefor and a tank to receive the discharge from the compressor, of means for starting and stopping said compressor, vent means for said tank adapted to be opened and closed, and means mechanically connected with said starting and stopping means for permitting the opening of said vent means when said compressor is stopped.

In testimony whereof I affix my signature.

LEWIS J. CLAPP.